United States Patent
Vladimerou et al.

(10) Patent No.: US 10,739,787 B2
(45) Date of Patent: Aug. 11, 2020

(54) RESPONSIBILITIES AND AGREEMENT ACCEPTANCE FOR VEHICLE PLATOONING

(71) Applicant: Toyota Motor Engineering & Manufacturing North America, Inc., Erlanger, KY (US)

(72) Inventors: Vladimeros Vladimerou, Whitmore Lake, MI (US); Colin E. Das, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 216 days.

(21) Appl. No.: 15/870,246

(22) Filed: Jan. 12, 2018

(65) Prior Publication Data

US 2019/0220037 A1    Jul. 18, 2019

(51) Int. Cl.
*G05D 1/02* (2020.01)
*G05D 1/00* (2006.01)

(52) U.S. Cl.
CPC ......... *G05D 1/0293* (2013.01); *G05D 1/0088* (2013.01)

(58) Field of Classification Search
CPC ...... G05D 1/0293; G05D 1/0088; G08G 1/22; G08G 1/123; G08G 1/202
USPC .......................................................... 701/23
See application file for complete search history.

(56) References Cited

U.S. PATENT DOCUMENTS

| | | |
|---|---|---|
| 9,182,764 B1 | 11/2015 | Kolhouse et al. |
| 9,423,791 B2 | 8/2016 | Lind et al. |
| 9,423,794 B2 | 8/2016 | Lind et al. |
| 2003/0182183 A1 | 9/2003 | Pribe |
| 2010/0211624 A1 | 8/2010 | Dichtl |
| 2010/0256852 A1 | 10/2010 | Mudalige |
| 2013/0041576 A1 | 2/2013 | Switkes et al. |
| 2013/0211624 A1 | 8/2013 | Lind et al. |
| 2014/0372561 A1 | 12/2014 | Hisano |
| 2015/0154871 A1 | 6/2015 | Rothoff et al. |
| 2015/0284010 A1 | 10/2015 | Beardsley et al. |

(Continued)

FOREIGN PATENT DOCUMENTS

| | | |
|---|---|---|
| WO | 2016134770 A1 | 9/2016 |
| WO | 2017035516 A1 | 3/2017 |

OTHER PUBLICATIONS

Kamali et al., "Formal verification of autonomous vehicle platooning", Elsevier, May 2017, 19 pages.

*Primary Examiner* — Brian P Sweeney
(74) *Attorney, Agent, or Firm* — Christopher G. Darrow; Darrow Mustafa PC

(57) ABSTRACT

The systems and methods described herein generally relate to semi-autonomous driving in a vehicular platoon. The lead vehicle initiates the platoon and identifies one or more trailing vehicle positions. Formation information is transmitted to at least one platoon-capable vehicle. A request for joining the platoon is received from the at least one platoon-capable vehicle, the request including acceptance of an agreement from the at least one platoon-capable vehicle, the agreement including lead vehicle responsibilities and trailing vehicle responsibilities. The lead vehicle then controls the platoon based on the lead vehicle responsibilities and delegates control based on the trailing vehicle responsibilities.

20 Claims, 8 Drawing Sheets

(56) References Cited

U.S. PATENT DOCUMENTS

2017/0212511 A1 7/2017 Paiva Ferreira et al.
2019/0086914 A1* 3/2019 Yen ..................... G05D 1/0022

* cited by examiner

RESPONSIBILITIES AND AGREEMENT ACCEPTANCE FOR VEHICLE PLATOONING

TECHNICAL FIELD

The subject matter described herein generally relates to platoon formation and, more particularly, the formation of a platoon between semi-autonomous vehicles.

BACKGROUND

Fully autonomous vehicles may travel as part of a platoon. A platoon is a group of vehicles that travel in a certain formation. In commercial truck platoons, at least, single row formations have been shown to give considerable fuel savings. For passenger cars, and as implied for commercial trucks, single row formations with a constantly engaged human driver in the leading vehicle can be used to compensate for inability to accurately monitor road surface and other events using electronic sensors. When the path condition is guaranteed to be drivable by the lead vehicle driver (based on the driver's knowledge of the following vehicles' automated driving system capabilities), the following vehicles could be driven automatically using sensing, computing and actuation systems, as compared to automatically driven vehicles travelling outside such formation.

SUMMARY

Disclosed herein are systems and methods to enable semi-autonomous driving in a vehicular platoon. In one embodiment, a platoon coordination system for organizing multiple vehicle control is disclosed. The platoon coordination system can include one or more processors; and a memory communicably coupled to the one or more processors. The memory can store an initiation module including instructions that when executed by the one or more processors cause the one or more processors to initiate a platoon by identifying one or more trailing vehicle positions, and to transmit formation information for joining the platoon to at least one platoon-capable vehicle, the formation information including at least one lead vehicle responsibility to the platoon and at least one trailing vehicle responsibility delegated to the at least one platoon-capable vehicle. The memory can further store an agreement coordination module including instructions that, when executed by the one or more processors, cause the one or more processors to receive a request for joining the platoon from the at least one platoon-capable vehicle, the request including acceptance of an agreement from the at least one platoon-capable vehicle, the agreement including the at least one lead vehicle responsibility and the at least one trailing vehicle responsibility. The memory can further store a platoon control module including instructions that, when executed by the one or more processors, cause the one or more processors to control at least a portion of the platoon based on the at least one lead vehicle responsibility and to delegate control of the at least one platoon-capable vehicle based on the at least one trailing vehicle responsibility.

In another embodiment, a non-transitory computer-readable medium for organizing multiple vehicle control is disclosed. The non-transitory computer-readable medium stores instructions that when executed by one or more processors cause the one or more processors to initiate a platoon by identifying one or more trailing vehicle positions. The medium can further include instructions to transmit formation information for joining the platoon to at least one platoon-capable vehicle, the formation information including at least one lead vehicle responsibility to the platoon and at least one trailing vehicle responsibility delegated to the at least one platoon-capable vehicle. The medium can further include instructions to receive a request for joining the platoon from the at least one platoon-capable vehicle, the request including acceptance of an agreement from the at least one platoon-capable vehicle, the agreement including the at least one lead vehicle responsibility and the at least one trailing vehicle responsibility. The medium can further include instructions to control at least a portion of the platoon based on the at least one lead vehicle responsibility. The medium can further include instructions to delegate control of the at least one platoon-capable vehicle based on the at least one trailing vehicle responsibility.

In another embodiment, a method for organizing multiple vehicle control is disclosed. The method can include initiating a platoon by identifying one or more trailing vehicle positions. The method can further include transmitting formation information for joining the platoon to at least one platoon-capable vehicle, the formation information including at least one lead vehicle responsibility to the platoon and at least one trailing vehicle responsibility delegated to the at least one platoon-capable vehicle. The method can further include receiving a request for joining the platoon from the at least one platoon-capable vehicle, the request including acceptance of an agreement from the at least one platoon-capable vehicle, the agreement including the at least one lead vehicle responsibility and the at least one trailing vehicle responsibility. The method can further include controlling the platoon based on the at least one lead vehicle responsibility. The method can further include delegating control of the at least one platoon-capable vehicle based on the at least one trailing vehicle responsibility.

BRIEF DESCRIPTION OF THE DRAWINGS

So that the manner in which the above recited features of the present disclosure can be understood in detail, a more particular description of the disclosure, briefly summarized above, may be had by reference to the embodiments, some of which are illustrated in the appended drawings. It is to be noted, however, that the appended drawings illustrate only typical embodiments of this disclosure and are therefore not to be considered limiting of its scope. The disclosure may admit to other equally effective embodiments.

To facilitate understanding, identical reference numerals have been used, wherever possible, to designate identical elements that are common to the Figures. Additionally, elements of one embodiment may be advantageously adapted for utilization in other embodiments described herein.

DETAILED DESCRIPTION

Disclosed herein are systems and methods to enable semi-autonomous driving in a vehicular platoon. Vehicle platoons suffer from ambiguity between vehicles and other agents (such as the manufacturer), thus making the formation of a platoon difficult in semi-autonomous situations. By creating a contract (also referred to herein as "an agreement") between the lead vehicle driver, the trailing vehicle drivers and the vehicle manufacturers, the responsibility of each vehicle and agent in the platoon can be made clear. The platoon can employ autonomous sensors and vehicle-to-vehicle (V2V) communications to ensure responsive control and trust. The platoon can further employ wireless networked communication (e.g., the cloud) to send signed contracts in which the drivers agree, regarding the individual vehicle responsibilities to the platoon formation, as evidence of their acceptance of said responsibilities. The signing of the signed contracts or agreements, as used herein, can include any method of confirming acceptance of the terms of the contract or agreement, including electronically signed, such as by using a public key infrastructure or an electronic certificate system. One electronic certificate system usable with embodiments described herein is an IEEE 1609.2 communication.

Figure 1:
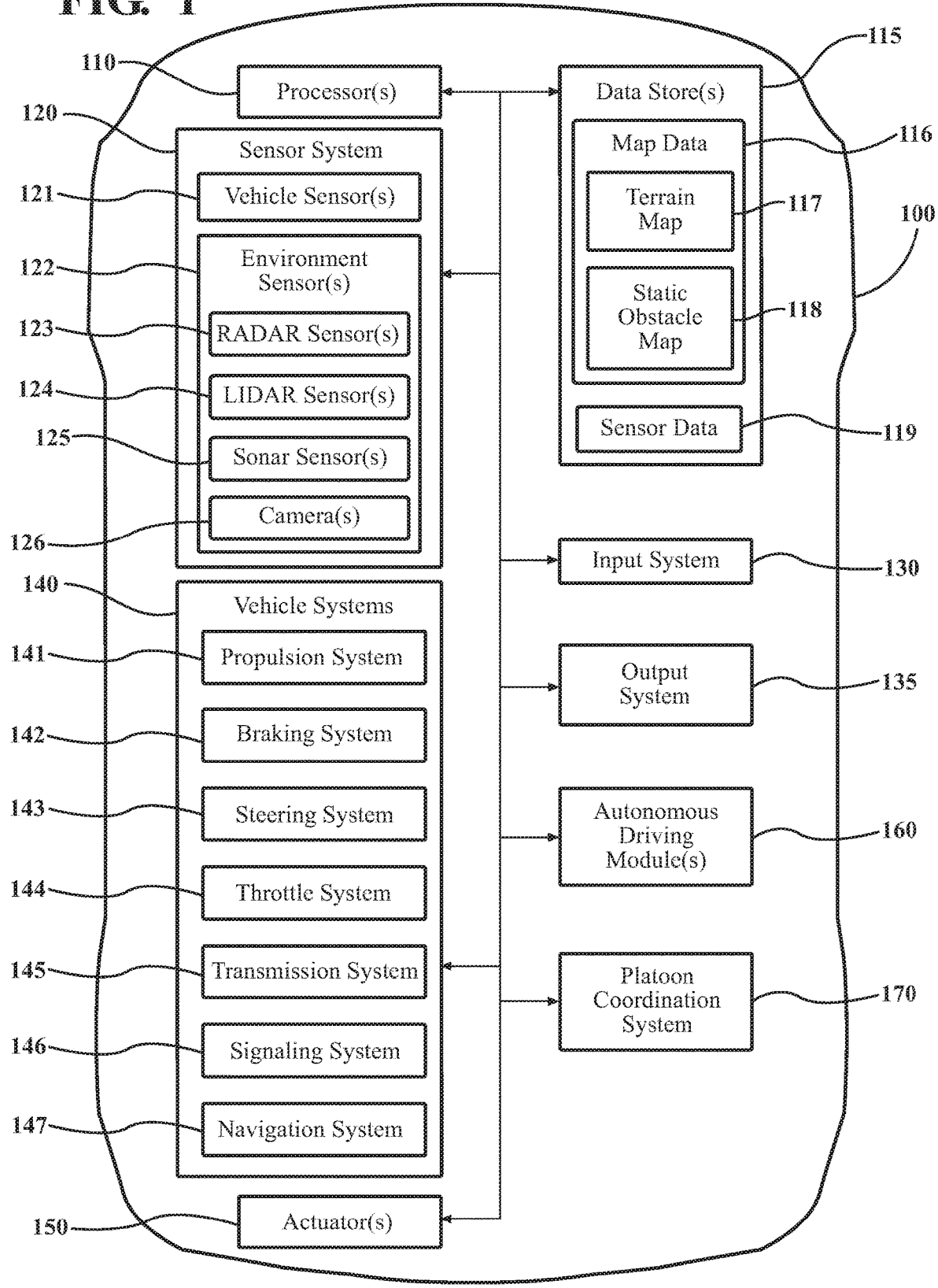
FIG. 1 is an illustration of a vehicle incorporating a platoon coordination system, according to embodiments described herein.

Referring to FIG. 1, an example of a vehicle 100 is illustrated. In one or more embodiments, the vehicle 100 is an automobile. In one or more embodiments, the vehicle 100 is a semi-autonomous vehicle. While arrangements will be described herein with respect to automobiles, it will be understood that embodiments are not limited to automobiles. In some embodiments, the vehicle 100 may be any other form of motorized transport that, for example, can operate at least semi-autonomously, can include a platoon coordination system or capabilities to support a platoon coordination system, and thus benefits from the functionality discussed herein. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver/operator. A semi-autonomous vehicle is defined as one whose human driver functions (acceleration, braking, steering) or subset thereof are performed automatically under some conditions. In one example, the semi-autonomous vehicle is an SAE level 3 autonomous vehicle. In one or more embodiments, the vehicle 100 is highly automated or completely automated. A highly automated or completely automated vehicle, as used herein, is a vehicle having automated driving and navigation systems such that the vehicle can operate with near or complete autonomy and limited driver interaction, from an origin to a destination. In one example, the highly automated or completely automated vehicle is an SAE level 4 autonomous vehicle In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 3, which provides for the autonomous driving module 160 controlling the vehicle 100 by one or more of braking, accelerating, and steering with some level of operator input. However, the driver/operator can be involved in monitoring the driving, controlling one or more non-autonomous systems, and be vigilant and ready to intervene with controlling the vehicle 100 if the autonomous driving module 160 fails to properly respond or is otherwise unable to adequately control the vehicle 100. In some embodiments, the driver/operator can control one or more non-autonomous devices or systems which are either limited or outside of the control of the autonomous driving module 160 for the vehicle 100.

The vehicle 100 can include a processor 110. In one or more arrangements, the processor 110 can be a main processor of the vehicle 100. In one example, the processor 110 can be an electronic control unit (ECU). Depending on the desired configuration, the processor 110 can be of any type for use in the data processing and analysis described herein. The processor 110 can be a microprocessor (µP), a microcontroller (µC), a digital signal processor (DSP), or any combination thereof. The processor 110 can be a set of one or more processors or can be a multi-processor core, depending on the particular implementation. Further, processor 110 can be one or more heterogeneous processor systems, in which a main processor is present with secondary processors on a single chip. In another example, the processor 110 can be a symmetric multi-processor system containing multiple processors of the same type. Further combinations or permutations of the processor 110 are contemplated without specific recitation herein.

The vehicle 100 can include a data store 115. The data store 115 is any piece of hardware that is capable of storing data or information. Examples of data or information which can be stored in the data store 115 include, without limitation, data, program code in functional form, and/or other suitable information either on a temporary basis and/or a permanent basis. The data store 115 can include one or more modules that include computer readable instructions that, when executed by the processor 110, cause the processor 110 to perform methods and functions that are discussed herein. The data store 115 can include volatile and/or non-volatile memory. An example of the data store 115 can include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor 110, or the data store 115 can be operably connected to the processor 110 for use thereby. The media used by data store 115 can be removable. For example, a removable hard drive can be used for data store 115. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road surface markings, structures, features, and/or landmarks in the one or more geographic areas. The map data 116 can include a digital map with information about road geometry. In one or more arrangement, the map data 116 can include one or more terrain maps 117. The terrain map(s) 117 can include information about the ground, terrain, roads, surfaces, and/or other features of one or more geographic areas. The terrain map(s) 117 can define one or more ground surfaces. In one or more arrangement, the map data 116 can include one or more static obstacle maps 118. The static obstacle map(s) 118 can include information about one or more static obstacles located within one or more geographic areas. The static obstacle map(s) 118 can include measurements, dimensions, distances, and/or information for one or more static obstacles. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component, system or combination thereof that can detect elements from the environment. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor 110, the data store 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" can include any device, component, system, element or arrangement or groups thereof that enable information/data to be entered into a machine. The input system 130 can receive an input from a vehicle passenger (e.g. a driver or a passenger), from other network capable vehicles, cloud services, or other remote agents. The vehicle 100 can include an output system 135. An "output system" can include any device, component, or arrangement or groups thereof that enable information/data to be presented to a vehicle passenger (e.g. a person, a vehicle passenger, etc.) or that allow for the communication of information or data from the vehicle 100 to a remote recipient (e.g., network connected infrastructure, other network capable vehicles, etc.). The input system 130 and the output system 135 can include any suitable communication interface depending on device type and include, but is not limited to, USB (universal serial bus), frame grabber, Ethernet, or Firewire. The input system 130 and the output system 135 can include components suitable for communication with devices, locally or remotely, such as over a network protocol (e.g., Ethernet or similar protocols).

The vehicle 100 can include one or more vehicle systems 140. Various examples of the one or more vehicle systems 140 are shown in FIG. 1. However, the vehicle 100 can include more, fewer, or different vehicle systems. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor 110 and/or the autonomous driving module(s) 160 can be operably connected to communicate with the various embodiments of the vehicle systems 140 and/or individual components thereof. For example, the processor 110 and/or the autonomous driving module(s) 160 can be in communication to send and/or receive information from the various embodiments of the vehicle systems 140 to control the movement, speed, maneuvering, heading, direction, or other autonomous features of the vehicle 100. The processor 110 and/or the autonomous driving module(s) 160 may control some or all of these vehicle systems 140 and, thus, may be partially or fully autonomous.

The processor 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor 110 and/or the autonomous driving module(s) 160 can control the direction and/or speed of the vehicle 100. The processor 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor 110 and/or the autonomous driving module(s) 160.

The vehicle 100 can include one or more modules, at least some of which are described herein. The modules can be implemented as computer-readable program code that, when executed by a processor 110, implement one or more of the various processes described herein. One or more of the modules can be a component of the processor 110, or one or more of the modules can be executed on and/or distributed among other processing systems to which the processor 110 is operably connected. The modules can include instructions (e.g., program logic) executable by one or more processor 110. Alternatively, or in addition, one or more data store 115 may contain such instructions. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The vehicle 100 further can include a platoon coordination system 170 that is implemented to control the formation of a platoon, establish responsibilities of each platoon member, and control vehicle maneuvers for vehicles which are part of the platoon. The platoon can include the vehicle 100, which can be a lead vehicle, and one or more platoon-capable vehicles, which occupy one or more trailing vehicle positions in the platoon. The platoon coordination system 170 can include an initiation module for initiation of the platoon and transmission of formation information, such as an initiation module 220, described with reference to FIG. 2 below. The platoon coordination system 170 can further include an agreement coordination module for formally establishing one or more vehicle responsibilities, such as agreement coordination module 230, described with reference to FIG. 2 below. The platoon coordination system 170 can further include a platoon control module for controlling the lead vehicle and components of the trailing vehicles, in light of at least one responsibility for the lead vehicle (hereinafter referred to as a "lead vehicle responsibility") and at least one responsibility for a trailing vehicle (hereinafter referred to as a "the trailing vehicle responsibility"), such as platoon control module 240, described with reference to FIG. 2 below.

The autonomous driving module(s) 160, either independently or in combination with the platoon coordination system 170, can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Figure 2:
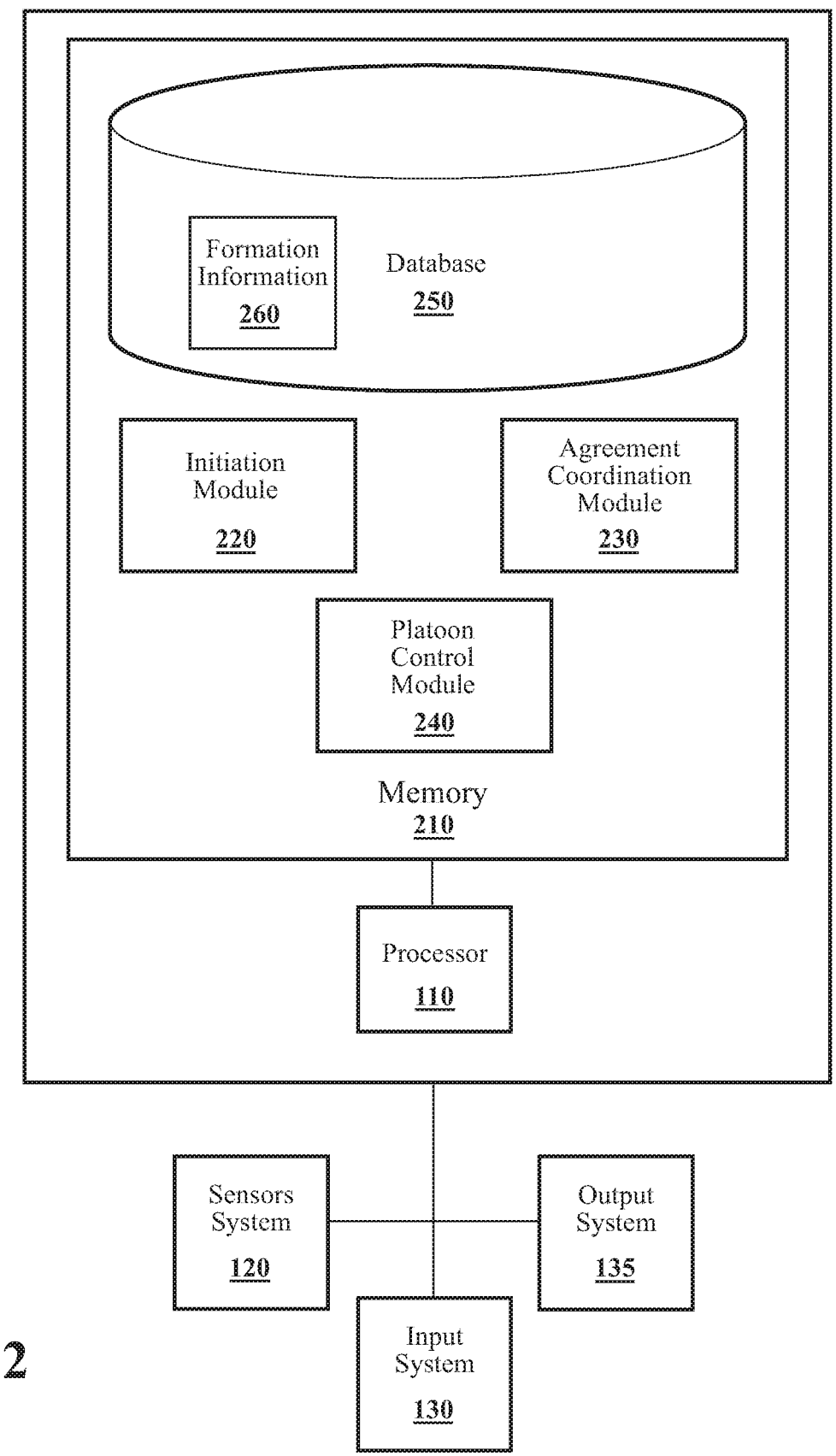
FIG. 2 is an illustration of a platoon coordination system, according to embodiments described herein.

The platoon coordination system 170 is more clearly described with reference to FIG. 2. The platoon coordination system 170, as described herein, initiates a platoon, coordinates formal agreement and responsibilities for all platoon-capable vehicles in the platoon and provides control for the platoon-capable vehicles in light of the lead vehicle responsibilities and the trailing vehicle responsibilities. As practically applied, the platoon coordination system 170, through the initiation module 220, will initiate the platoon with the vehicle 100 acting as the lead vehicle for the platoon. The initiation module 220 can include instructions for forming trailing vehicle positions and broadcasting the existence of the platoon to the platoon-capable vehicle. The platoon-capable vehicle can then, through the agreement coordination module 230, receive a request to join the platoon, where the agreement coordination module 230 will receive the request, seek acceptance of the agreement from the platoon-capable vehicle, and present the trailing vehicle responsibilities to the platoon-capable vehicle. Once the platoon-capable vehicle's acceptance has been received, the platoon control module 240 can control the vehicle 100 and control the platoon-capable vehicle. The platoon control module 240 can control the trailing vehicle responsibilities. In this way, the responsibilities of each member of the platoon can be agreed on by all parties and delegated accordingly to a variety of autonomous systems and drivers though the platoon coordination system 170, prior to engagement in the platoon.

"Platoon-capable vehicle" as used herein refers to vehicles which have the ability to operate safely, using one or more autonomous systems and human interaction, as part of a platoon. Platoon-capable vehicles can include one or more systems as described with reference to FIG. 1. In one example, the platoon-capable vehicles are autonomous vehicles with an SAE autonomous vehicle classification of level 3 or greater.

The platoon coordination system 170 is shown as including the processor 110 from the vehicle 100 of FIG. 1. Accordingly, the processor 110 can be a part of the platoon coordination system 170, the platoon coordination system 170 can include a separate processor from the processor 110 of the vehicle 100, or the platoon coordination system 170 can access the processor 110 through a data bus or another communication path. In one embodiment, the platoon coordination system 170 can include a memory 210 that stores an initiation module 220, an agreement coordination module 230, and a platoon control module 240. The memory 210 can be a random-access memory (RAM), read-only memory (ROM), a hard-disk drive, a flash memory, or other suitable memory for storing the modules 220, 230, and 240. In one example, the modules 220, 230, and 240 are computer-readable instructions that when executed by the processor 110, cause the processor 110 to perform the various functions disclosed herein.

With continued reference to the platoon coordination system 170, in one embodiment, the platoon coordination system 170 can include the database 250. The database 250 is, in one embodiment, an electronic data structure stored in the memory 210 or another data store. The database 250 can be configured with routines that can be executed by the processor 110 for analyzing stored data, providing stored data, organizing stored data, and so on. Thus, in one embodiment, the database 250 stores data used by the modules 220, 230, and 240 in executing various functions.

The platoon coordination system 170 can include the initiation module 220. The initiation module 220, as stored in the memory 210, can include instructions that function to control the one or more processors, such as processor 110, to transmit formation information 260 for joining the platoon to the platoon-capable vehicle. The formation information 260 can be stored in the database 250. The platoon-capable vehicle can be a vehicle with one or more autonomous systems, allowing the vehicle to interact as part of a platoon. The platoon-capable vehicle can include a semi-autonomous vehicle. In embodiments where the platoon-capable vehicle includes more than one platoon-capable vehicle, one or more of said platoon-capable vehicles can be a fully autonomous vehicle. In SAE level 3 driving as described herein, there can be intervals where manual driving can be conditioned by the safety protocols. As described herein, such intervals can be scheduled in advance and at times/locations agreed in the protocols and during the formation of the platoon. Such intervals can include during unexpected events. Unexpected events can include events that introduce a possibility that the trailing vehicles may, in the foreseeable future, not be able to handle a given situation. During unexpected events, a mechanism can exist that hands back control of the trailing vehicles to the drivers, putting the drivers back into the driving role.

The formation information 260 is information that can be used in relation to and/or as a prerequisite to the formation of a platoon. The formation information 260 can include positions available in the platoon, requirements for entering and exiting the platoon, the time period that the platoon is intended for, the destination of the platoon, any intermediate stops for the platoon, an agreement, and combinations thereof. In another embodiment, the formation information 260 can be stored in a remote database, the remote database being referenced by the initiation module 220. The formation information 260 can provide information for the formation of a platoon under a number of circumstances, such as based on vehicle type, weather conditions, type of road, local laws and regulations or others. As such, the initiation module 220 can use a portion of the formation information 260, as applicable to the current situation of the vehicle 100 or applicable to the potential platoon-capable vehicles sought.

The formation information 260 can include a protocol for the platoon. The protocol can include one or more procedures for platoon behavior. In one embodiment, the protocol can include maximum and minimum following distances for the lead vehicle with respect to its preceding traffic. In another embodiment, the protocol can include maximum speed and lateral acceleration (empirical measures). In another embodiment, the protocol can include maximum and minimum following distances for autonomous trailing vehicle controllers. In another embodiment, the protocol can include procedure for parking on the shoulder. In another embodiment, the protocol can include procedure for reacting to road debris. In another embodiment, the protocol can include procedure for adjacent lane obstructions. In another embodiment, the protocol can include procedure for dissolving the platoon. In another embodiment, the protocol can include time allowance to react to calls by leader and other followers. The protocol can be forwarded or otherwise made available prior to initiating the platoon or after the platoon has been initiated.

In one embodiment, the formation information 260 can include the agreement. The agreement is a statement of the terms of the platoon interaction, between two or more vehicles. The agreement can include the roles and identification of each agent (e.g., lead vehicle, trailing vehicle, manufacturer), the lead vehicle responsibility, the trailing vehicle responsibility, the manufacturer responsibilities (e.g., can be implied by sale of vehicles), and electronic signature or other formal approval with trailing vehicle (e.g., driver) and manufacturer consent on every occasion.

The agreement can be delivered by any available means, such as a written agreement or verbalized agreement, whether electronic or otherwise, that communicates the terms of the agreement. In one embodiment, the agreement is a written agreement delivered to the platoon-capable vehicle upon initiation of the platoon. In this embodiment, the agreement is forwarded with the formation information to the platoon-capable vehicle. The platoon-capable vehicle then presents the agreement, or portions thereof, on a screen or display. The driver or user of the platoon-capable vehicle can either approve or reject the agreement in a variety of ways, such as pressing a button on the touch-sensitive screen, by voice command, by pressing a physical button, or by other method.

The agreement can include the lead vehicle responsibility and the trailing vehicle responsibility. The trailing vehicle responsibility can include requirements and restrictions related to participation in the platoon, such as rules, limitations, expected actions, road coordination, or others as related to the trailing vehicle interacting with the road or other vehicles in the platoon. The lead vehicle responsibility can include requirements and restrictions related to guiding or controlling the platoon, such as rules, limitations, expected actions, road coordination, or others as related to the lead vehicle interacting with the road or other vehicles in the platoon.

The lead vehicle responsibility can include a responsibility to the platoon. In one example, the lead vehicle responsibility can include remaining in the same lane at all times. In another example, the lead vehicle responsibility can include allowing or denying requests to enter platoon. In another example, the lead vehicle responsibility can include achieving speeds no faster than required rates. In another example, the lead vehicle responsibility can include alerting the platoon-capable vehicle when obstructions will prevent platoon to continue in same lane. In another example, the lead vehicle responsibility can include alerting before changing lanes at the required time in advance. In another example, the lead vehicle responsibility can include alerting in case anything may cause the platoon-capable vehicle controllers to not be able to follow the center of the lane safely (e.g. hazardous vehicle, police sirens, road debris, etc.). In another example, the lead vehicle responsibility can include slowing down and lead the platoon into an available section of the shoulder in case a driver becomes unresponsive and stopping in the middle of the highway is not safe.

The trailing vehicle responsibility can be a responsibility to the platoon-capable vehicle. The lead vehicle responsibility can be between varieties of parties, such as between the lead vehicle and the platoon-capable vehicle, the platoon as a group, the vehicle manufacturer, or combinations thereof. The trailing vehicle responsibility can be between a varieties of parties, such as between the platoon-capable vehicle and the lead vehicle, the platoon-capable vehicle, the platoon as a group, the vehicle manufacturer, or combinations thereof. In one example, the trailing vehicle responsibility can include signaling when exiting platoon at required time before beginning to exit. In another example, the trailing vehicle responsibility can include maintaining speed while exiting. In another example, the trailing vehicle responsibility can include requesting permission to enter platoon/confirm joining. In another example, the trailing vehicle responsibility can include resuming manual control at pre-agreed locations/times. In another example, the trailing vehicle responsibility can include maintaining control of one or more systems, such as signaling. In another example, the trailing vehicle responsibility can include never exiting the lane manually.

In further embodiments, the agreement can include manufacturer responsibilities. In this embodiment, the manufacturer would have to accept said responsibilities. Manufacturer responsibilities are responsibilities for autonomous systems, when the system is under autonomous control. In one example, the manufacturer responsibility can include steering, acceleration, and braking while in formation. In another example, the manufacturer responsibility can include identifying the lane, staying within lane even when lane markers disappear, and assuming the lead vehicle remains within its lane. In another example, the manufacturer responsibility can include determining and maintaining safe gap to the preceding platoon-capable vehicle. In another example, the manufacturer responsibility can include providing alerts to driver as needed by safety protocol. In another example, the manufacturer responsibility can include maintaining correct position within the lane to avoid lateral obstructions (e.g., within the limits of the lane). In another example, the manufacturer responsibility can include transmitting biometric health indicators for the driver (e.g., required heart beat signals). In another example, the manufacturer responsibility can include electronically communicating automatically while driving inside a platoon or when entering, changing, or exiting the platoon. In another example, the manufacturer responsibility can include electronically operating hazard lights. In another example, the manufacturer responsibility can include automatically signing an agreement using V2V security credentials based on driver commands of acceptance/rejection. In another example, the manufacturer responsibility can include providing human machine interface (HMI) to facilitate contract signing and presenting platoon information to drivers.

By way of example using the vehicle 100, the vehicle 100 can initiate a platoon using instructions from the initiation module 220. The initiation module 220, through execution by the processor 110, can use information collected from the sensor system 120, the map data 116, the sensor data 119, or combinations thereof, to initiate the platoon. Initiating the platoon can include using the autonomous driving module 160 to appropriately position the lead vehicle on the road, determine one or more trailing vehicle positions, and send out a request using the output system 135 for forming a platoon to nearby platoon-capable vehicles. Further, during the initiation, the platoon transmits the formation information 260, including the agreement, to the platoon-capable vehicles in proximity to the vehicle 100.

The platoon coordination system 170 can further include the agreement coordination module 230. The agreement coordination module 230, as stored in the memory 210, can include instructions that function to control the one or more processors, such as processor 110, to receive a request for joining the platoon from the platoon-capable vehicle. The request for joining the platoon can be a signal or indication that the vehicle is capable of performing the trailing vehicle responsibilities and is interested in trailing the vehicle 100 for a portion or all of the intended route. The platoon-capable vehicle can communicate with the vehicle 100 using one or more communication systems, to provide an indication to the vehicle 100 that the platoon-capable vehicle would like to enter the platoon. The request can include acceptance of the agreement from the platoon-capable vehicle. In some embodiments, the acceptance or confirmation of acceptance of the agreement can be the request. In one example, the request consists of the acceptance of the agreement.

The agreement can be affirmed or otherwise agreed to at any time prior to entering the platoon. The agreement can be affirmed or denied through any available source, including using a computing device, verbally or electronically over a phone, a physical printed document, in the case at the point of entry into the platoon, or by any other available communication scheme. In one embodiment, the agreement is reviewed and agreed to through a web site. In further embodiments, the agreement can be originally agreed to through another source, with subsequent interactions requiring affirmation of the agreement. Using the above embodiment, once the agreement is agreed to through the website, the agreement can be affirmed by a touch screen affirmation of the previously signed agreement prior to each entry into a platoon with vehicle 100. Though noted throughout as acceptance of the agreement by the vehicle (e.g., the platoon capable vehicle or the lead vehicle), it is understood that the operator of said vehicle accepts the agreement, either directly or indirectly. The vehicle can then perform on the responsibilities of the agreement through one or more autonomous systems, through manual operator interaction with the vehicle, through control systems involving a third party (e.g., the manufacturer or others), or combinations thereof.

The agreement can be specific to a lead vehicle, the platoon-capable vehicle, a manufacturer or any combination thereof. As stated here, the agreement accepted by the platoon-capable vehicle can relate to a specific lead vehicle, platoons formed by a class of vehicles (all vehicles with the system 170), all vehicles from a specific manufacturer, all vehicles having systems capable of one or more platoon functions or others. In the same vein, the agreement accepted by the lead vehicle can relate to a specific platoon-capable vehicle, platoons formed by a class of vehicles (all vehicles with the system 170), all vehicles from a specific manufacturer, all vehicles having systems capable of one or more platoon functions or others.

The agreement coordination module 230 receives the agreement and makes a determination of whether the platoon-capable vehicle is allowed to enter the platoon. The determination can include how many vehicles have already accepted, review of capabilities of the platoon-capable vehicles, vehicle preference or driver preference (assuming the possibility that a driver or a vehicle has violated one or more trailing vehicle responsibilities in the past), or other vehicles relevant to the vehicle 100 in forming a viable platoon. The agreement coordination module 230 can then convey to the platoon-capable vehicle platoon acceptance or platoon rejection. The agreement coordination module, upon communicating platoon acceptance, can provide guidance for the platoon-capable vehicle on joining the platoon. The guidance can include further information regarding positioning in the platoon (e.g., the trailing vehicle position for the platoon-capable vehicle), movement between lanes for entry into the platoon, what speeds the platoon must maintain to allow entry, and other criteria.

Further referring to the example using the vehicle 100, the vehicle 100 can receive a response from the platoon-capable vehicle through the agreement coordination module 230. The agreement coordination module 230, through execution by the processor 110, can process the agreement received from the platoon-capable vehicle, as well as information received about the capabilities of the platoon-capable vehicle and driver preference or vehicle preference. Information or other input can be received by the agreement coordination module 230, through the input system 130. Capabilities of the platoon-capable vehicle can include what systems are under autonomous control, what systems are currently controlled autonomously, what systems are under user or driver control, max speed, maneuvering capabilities, and other facets of the platoon-capable vehicle. Driver preference or vehicle preference can include information about the driver's capabilities, about the specific vehicle, and violations of the trailing vehicle responsibilities by either the driver or the vehicle. Of note, the system 170 can keep track of violations of the responsibilities which are systemic (e.g., the autonomous driving system failed to respond as required by the agreement) and violations which are driver related (e.g., the driver did not respond to or respect the requirements as established by the agreement).

The platoon coordination system 170 can further include the platoon control module 240. The platoon control module 240, as stored in the memory 210, can include instructions that function to control the one or more processors, such as processor 110, to control the lead vehicle and/or the platoon-capable vehicle, based on the lead vehicle responsibility to the platoon. As such, the platoon control module 240 can function in one or more ways to control at least a portion of the platoon. Controlling the platoon can include controlling the formation of the platoon or controlling the one or more vehicles which form the platoon.

"Controlling the platoon" or "controlling at least a portion of the platoon", as used herein, describes at least one action taken to control at least a portion of some aspect of the platoon. "Controlling the platoon" or "controlling at least a portion of the platoon" can include controlling one or more steps of platoon formation and maintenance, such as controlling the formation once vehicles have joined, controlling whether or not vehicles join or leave the platoon, or others. As such, controlling the platoon formation, once established, can be centralized or decentralized. In one embodiment, vehicles can drive on their own, based on measurements received. In another embodiment, vehicles can drive on their own, based on they are told how to drive by other vehicles or other sources. Further, controlling how to establish the platoon formation, with regards to vehicles joining and exiting the platoon, can also be done in a centralized, decentralized or distributed manner. In embodiments described herein, vehicles can agree on forming a platoon based on instructions from a single central communicator, based on pair-wise communication, based on their own measurements and control actions, or combinations thereof.

The platoon control module 240 can provide instructions to control one or more autonomous systems of the platoon-capable vehicle. Autonomous systems which can be controlled by the platoon control module 240 can include steering systems, braking systems, propulsion systems, throttle systems, transmission systems, signaling systems, navigations systems, or combinations thereof. In one example, the platoon control module 240 controls all autonomous systems of the lead vehicle. In another example, the platoon control module 240 controls the steering system, and navigation system of the platoon-capable vehicle, with all other systems controlled either by autonomous systems of the platoon-capable vehicle or by the driver of said platoon-capable vehicle.

Further, the platoon control module 240 can control one or more of the autonomous systems in fulfillment of the lead vehicle responsibility. In one embodiment, the lead vehicle responsibility requires that the lead vehicle maintain a pace of 75 miles per hour (MPH) while in the platoon. In this case, the lead vehicle can send instructions through the output system 135 to the platoon-capable vehicle to control the propulsion system and braking system to maintain the pace of the platoon-capable vehicle within the required range. In one embodiment, the lead vehicle responsibility and the trailing vehicle responsibility can be mutually exclusive. In one example, the lead vehicle responsibility can include alerting before changing lanes. Here, as this is included in the lead vehicle responsibility, the trailing vehicle responsibility will not include this responsibility.

Further referring to the example using the vehicle 100, the vehicle 100 can control the lead vehicle using the platoon control module 240. The platoon control module 240 can communicate with the autonomous driving module 160. The platoon control module 240 can provide one or more limitations in light of the lead vehicle responsibility to the autonomous driving module 160. The autonomous driving module 160 can then control the vehicle 100, as described above to fulfill the requests of the platoon control module 240. In further embodiments, the platoon control module 240 can control one or more systems of the platoon-capable vehicle. This can include any autonomous system described above, or combination thereof, in light of the lead vehicle responsibility.

In a further embodiment, the platoon control module 240 can include instructions to delegate control of the platoon-capable vehicle based on the trailing vehicle responsibility. As stated previously, the trailing vehicle responsibility is delegated to the platoon-capable vehicle in the agreement. As such, the platoon control module 240 can function such that the trailing vehicle responsibility, which is delegated to the platoon-capable vehicle, is not controlled or hindered by the platoon control module 240. In one example, the platoon control module 240 can control at least a portion of the platoon, such that the platoon-capable vehicle can fulfill the trailing vehicle responsibility.

Thus, the platoon coordination system 170 can create a platoon where the responsibilities for each member of the platoon, and for each involved party in a platoon (drivers and manufacturers), are clearly provided and delegated. In this way, the risks of forming and being involved in a platoon can be minimized. The agreement provides mutual informed consent for all members of the platoon, such that the requirements of all parties are agreed upon.

Figure 3A:
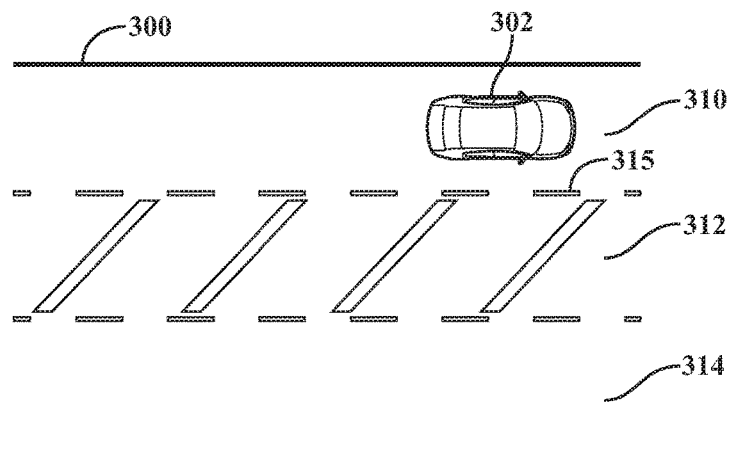
FIGS. 3A-3L are an aerial view of a vehicle employing a platoon coordination system in a vehicular environment, according to one embodiment.

FIG. 3A-3L depicts an aerial view of a vehicle employing a platoon coordination system, according to embodiments described herein. Depicted here is a stepwise view of the formation of a platoon, from formation to dissolution. In FIG. 3A, we can see a lead vehicle 302 as positioned in a platooning lane 310 of a road 300. The road 300 can further include road markings 315. The road markings 315 can serve to differentiate other portions of the road, such as a joining vehicle lane 312 and an independent vehicle lane 314. The joining vehicle lane 312 is a lane used by one or more vehicles joining or exiting a platoon. The independent vehicle lane is a lane for standard autonomous or non-autonomous driving. Though shown here for clarity, the joining vehicle lane 312 and the independent vehicle lane 314 are employed in optional embodiments of the platoon coordination system 170. The platoon coordination system 170 can function in a similar manner on standard roads, including roads with less than or more than 3 traffic lanes. The lead vehicle 302 is the front vehicle in the platoon. The lead vehicle 302 controls the movement, speed and other factors of the platoon according to the lead vehicle responsibility, described above. The lead vehicle 302 can be substantially similar to the vehicle 100, including the platoon coordination system 170, as described with reference to FIGS. 1 and 2.

Figure 3B:
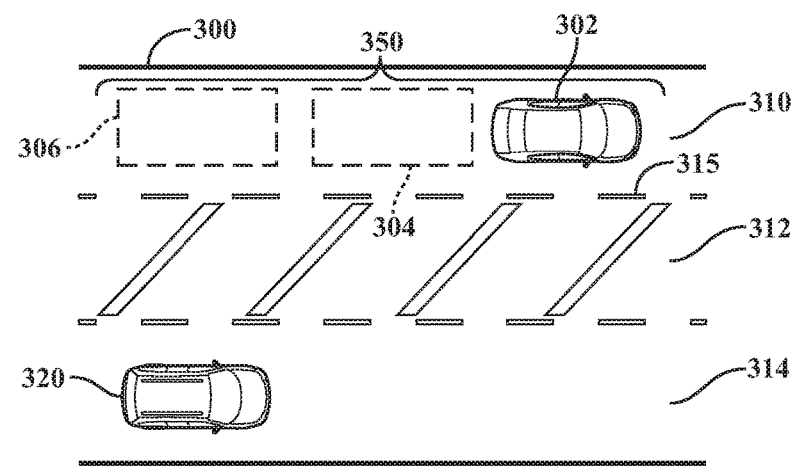

Using the initiation module 220, the lead vehicle 302 initiates a platoon, as shown in FIG. 3B. The platoon 350 is shown here as the lead vehicle 302 in line with a first trailing vehicle position 304 and a second trailing vehicle position 306. The platoon 350 is formed in a line in the platooning lane 310. The initiation of the platoon can be as described with reference to FIG. 2. Shown here, the initiating the platoon can include the creation of a first trailing vehicle position 304 and a second trailing vehicle position 306 in the platooning lane 310. Further, the initiation module 220 announces the platoon to the platoon-capable vehicle, shown here as first trailing vehicle 320. The first trailing vehicle 320 can be an autonomous or semi-autonomous vehicle. Shown here, the first trailing vehicle 320 is a semi-autonomous vehicle, as described above. The first trailing vehicle 320 receives the initiation request from the initiation module 220 and requests to join the platoon.

The first trailing vehicle 320 reviews and approves the agreement and forwards the agreement to the lead vehicle 302. Simultaneously, the agreement can be transmitted to a manufacturer. The functioning (e.g., programming, logic, AI, etc.) of one or more autonomous systems are not presumed under the control of the individual driver. As such, the platoon coordination system 170 can include the manufacturer in the agreement formation. The manufacturer can have approved of the agreement in advance or can approve of the agreement during the present communication. Using the agreement coordination module 230, the lead vehicle receives and considers the request. In this embodiment, the lead vehicle 302 has two open spaces in the platoon 350, being the trailing vehicle positions 304 and 306. Following the same example, the lead vehicle 302 sees that the agreement has been approved by all parties and the vehicle is capable of performing the functions designated for a position in the platoon. Thus, the lead vehicle 302, using the agreement coordination module 230 and the output system 135, sends guidance for entering the platoon to the first trailing vehicle 320.

Figure 3C:
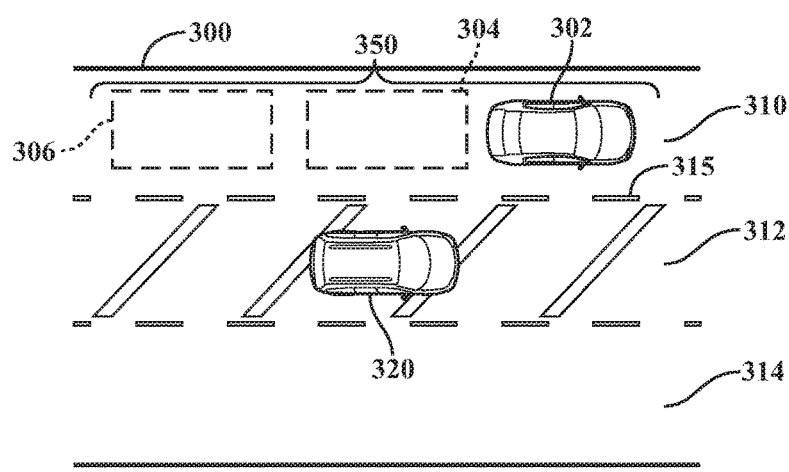

The guidance, depicted in FIG. 3C, can include details or information that assist in entry or exit of a member of the platoon 350. The guidance can include speed of entry or exit, position of entry, timing for each movement, and other details helpful in guiding the trailing vehicle. Shown here, the guidance can include that the first trailing vehicle 320 will be entering the platoon at trailing vehicle position 304 and the lead vehicle 302 will slow down the platoon 350 to allow entry. In response to the guidance, the first trailing vehicle 320 can move into position for entry into the platoon 350. In this example, the first trailing vehicle 320 has moved from the independent vehicle lane 314 to the joining vehicle lane 312 and had moved beside the first trailing vehicle position 304.

Figure 3D:
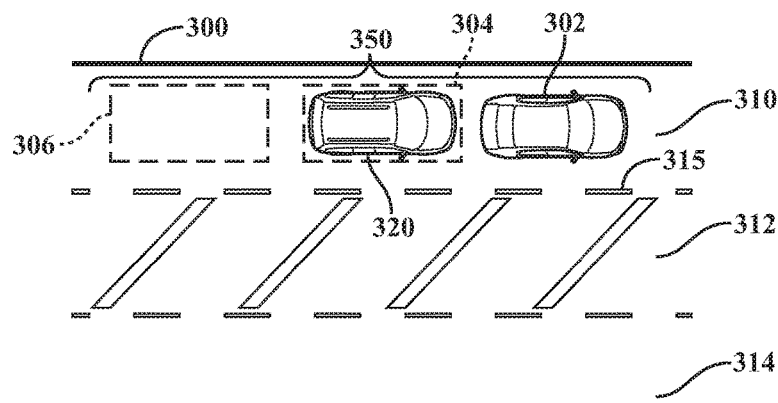

FIG. 3D depicts the first trailing vehicle 320 in the first trailing vehicle position 304. The first trailing vehicle 320 can move into the first trailing vehicle position 304. The first trailing vehicle position 304 is depicted as a box on the platooning lane 310. However, the "box", shown here for illustration purposes, is an unoccupied region behind the lead vehicle 302, which has been selected for trailing vehicles to be moved into as they join the platoon 350. The number of trailing vehicle positions can be greater or less than shown here. The first trailing vehicle 320 can receive further guidance regarding entering the first trailing vehicle position 304 of the platoon 350. Shown here, the first trailing vehicle 320 slows down to an appropriate speed and moves into the first trailing vehicle position 304 of the platoon 350. The speed and other guidance, offered through the platoon control module 240, for movement into the platoon 350 can also be required in the trailing vehicle responsibility.

The movement into the lane, such as by the first trailing vehicle 320, can be controlled autonomously. In one embodiment, the lead vehicle 302 can control the first trailing vehicle 320 moving into the joining vehicle lane 312 using the platoon control module 240. The platoon control module 240 can communicate instructions to the first trailing vehicle 320, using the output system 135. The instructions can include timing for individual movements and events, wheel direction, final position for the lane, acceleration, and other factors. The instructions can then control acceleration, braking and/or steering, using the autonomous driving system of the first trailing vehicle 320, to move the first trailing vehicle 320 into the first trailing vehicle position 304. In another embodiment, the lead vehicle 302 can control the first trailing vehicle 320 moving into the first trailing vehicle position 304 of the platooning lane 310, using the platoon control module 240. The platoon control module 240 can communicate instructions to the first trailing vehicle 320, using the output system 135. The instructions can then control acceleration, braking and/or steering, using the autonomous driving system of the first trailing vehicle 320, to move the first trailing vehicle 320 into the first trailing vehicle position 304.

Figure 3E:
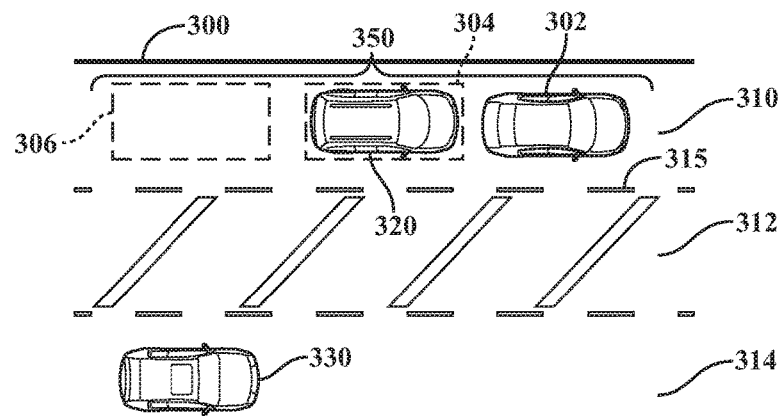

FIG. 3E depicts another platoon-capable vehicle, a second trailing vehicle 330, approaching in the independent vehicle lane 314. As the platoon is already initiated, the initiation module 220 can announce the platoon to the second trailing vehicle 330. The second trailing vehicle 330 can be an autonomous or semi-autonomous vehicle. Shown here, the second trailing vehicle 330 is a semi-autonomous vehicle, as described above. The second trailing vehicle 330 receives the initiation request from the initiation module 220 and requests to join the platoon. The second trailing vehicle 330 reviews and approves the agreement and forwards the agreement to the lead vehicle 302. Using the agreement coordination module 230, the lead vehicle 302 receives and considers the request. As above, the lead vehicle 302 sees that the agreement has been approved and the vehicle is capable of performing the functions designated for a position in the platoon. Thus, the lead vehicle 302, using the agreement coordination module 230 and the output system 135, sends guidance for entering the platoon to the second trailing vehicle 330.

Figure 3F:
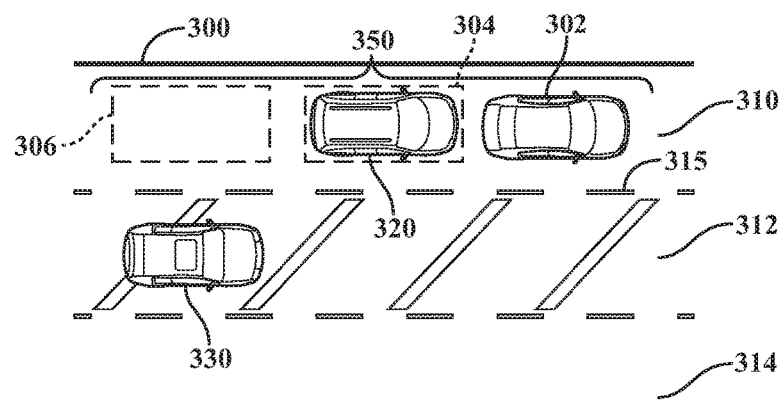

The guidance, depicted in FIG. 3F, can include details or information that assist in entry or exit of a member of the platoon 350. The guidance can be substantially similar to the guidance given to the first trailing vehicle 320. Shown here, the guidance can include that the second trailing vehicle 330 will be entering the platoon at trailing vehicle position 306 and the lead vehicle 302 will slow down the platoon 350 to allow entry. Here, the lead vehicle 302, through the platoon control module 240, transmits instructions and guidance to the first trailing vehicle 320. The instructions can include control of one or more autonomous systems to slow the vehicle to the appropriate speed, guidance regarding a change in speed to which the first trailing vehicle will need to respond, or others, In response to the guidance, the first trailing vehicle 320 slows down with the lead vehicle 302, allowing the second trailing vehicle 330 to enter at the second trailing vehicle position 306. The second trailing vehicle 330 can move into position for entry into the platoon 350. In this example, the second trailing vehicle 330 has moved from the independent vehicle lane 314 to the joining vehicle lane 312 and had moved beside the second trailing vehicle position 306.

Figure 3G:
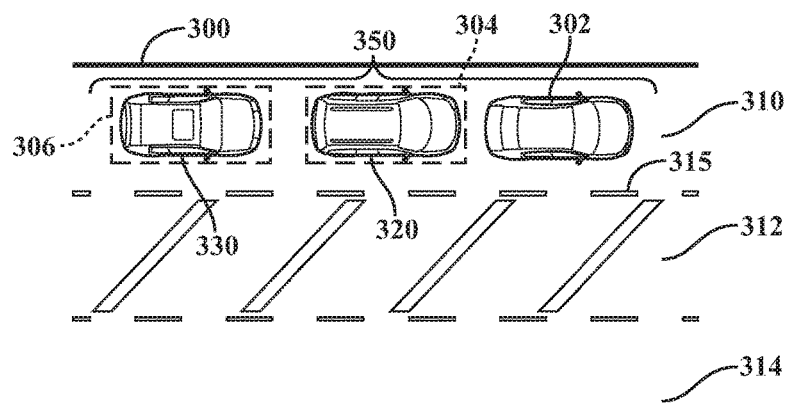

FIG. 3G depicts the second trailing vehicle 330 in the second trailing vehicle position 306. The second trailing vehicle 330 can move into the second trailing vehicle position 306, from the joining vehicle lane 312. The second trailing vehicle position 306 is depicted as a box on the platooning lane 310. The second trailing vehicle 330 can receive further guidance regarding entering the second trailing vehicle position 306 of the platoon 350. Shown here, the second trailing vehicle 330 slows down to an appropriate speed and moves into the second trailing vehicle position 306 of the platoon 350. The speed and other guidance can be offered through the platoon control module 240. The speed and other guidance for movement into the platoon 350 can also be required in the trailing vehicle responsibility, as described above. During this time, the first trailing vehicle 320 can transmit a indication to the lead vehicle 302 that it would like to exit the platoon 350. In another embodiment, upon joining the platoon, there may be a further agreement formed between the first trailing vehicle 320 and the second trailing vehicle 330. This agreement can set the responsibilities of the vehicles with regard to one another. Further and other permutations of the agreements described here are contemplated.

Figure 3H:
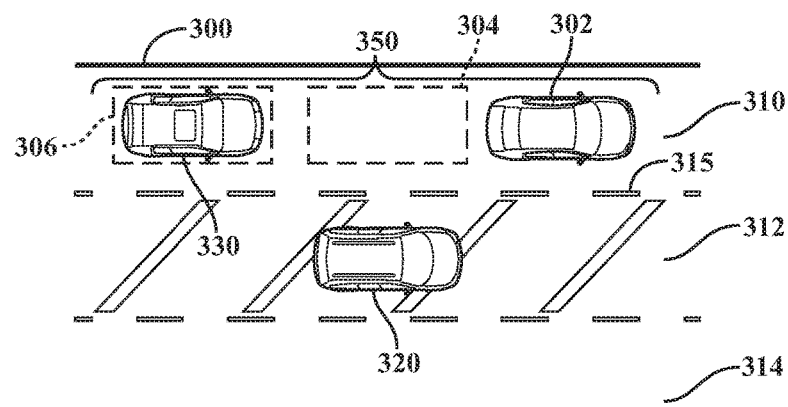

FIG. 3H depicts the first trailing vehicle exiting the platoon 350. The lead vehicle 302 can receive the communication using the agreement coordination module 230. The lead vehicle 302 can then review the lead vehicle responsibility and the trailing vehicle responsibility to determine of the first trailing vehicle has fulfilled its responsibilities to the platoon. Noting that the trailing vehicle responsibility has been met to leave the platoon 350, the lead vehicle 302 can then communicate guidance and instructions as described above. In response to the guidance, the second trailing vehicle 330 slows down with the lead vehicle 302, allowing the first trailing vehicle 320 to leave the platoon 350. The first trailing vehicle 320 then moves from the platooning lane 310 to the joining vehicle lane 312, leaving an opening at the first trailing vehicle position 304.

Figure 3I:
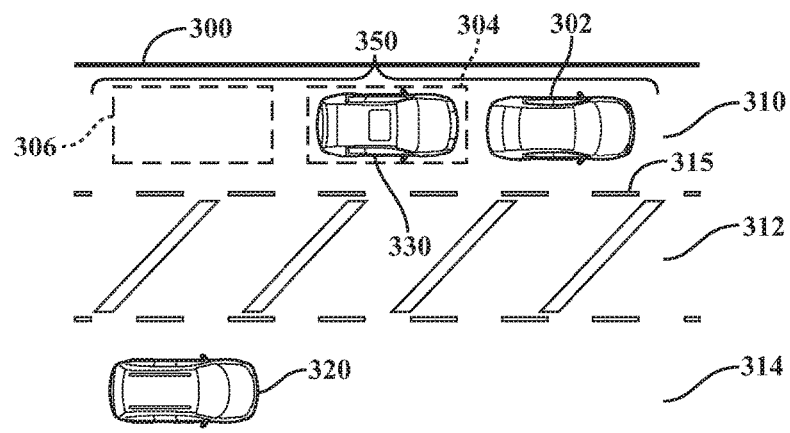

In FIG. 3I, the second trailing vehicle 330 receive further instructions or guidance from the lead vehicle 302, in light of the lead vehicle responsibility and the trailing vehicle responsibility. In one embodiment, the lead vehicle 302 can communicate to the second trailing vehicle 330 to move from the second trailing vehicle position 306 to the first trailing vehicle position 304. The communication can include controlling one or more autonomous systems of the second trailing vehicle 330 and/or providing guidance to the second trailing vehicle regarding speed, distance, and timing for the movement. During this time, the first trailing vehicle 320 can have fulfilled its responsibilities to the platoon 350 by exiting the joining vehicle lane 312 into the independent vehicle lane 314. The agreement between can be dissolved at this point, or maintained for future use, depending on the details of the agreement.

The second trailing vehicle 330 can move into the first trailing vehicle position 304, while following the trailing vehicle responsibility. In this example, the second trailing vehicle 320 has moved from the second trailing vehicle position 306 to the first trailing vehicle position 304, leaving the second trailing vehicle position 306 empty. When the second trailing vehicle 330 moves into the first trailing vehicle position 304, this can include an updated list of responsibilities, instructions or guidance, in light of differences between the trailing vehicle responsibilities of each trailing vehicle position. In one example, the second trailing vehicle 330 can receive updated guidance or instructions regarding the following distance from the lead vehicle, as compared to following distance between the second trailing vehicle 330 and the first trailing vehicle 320.

Figure 3J:
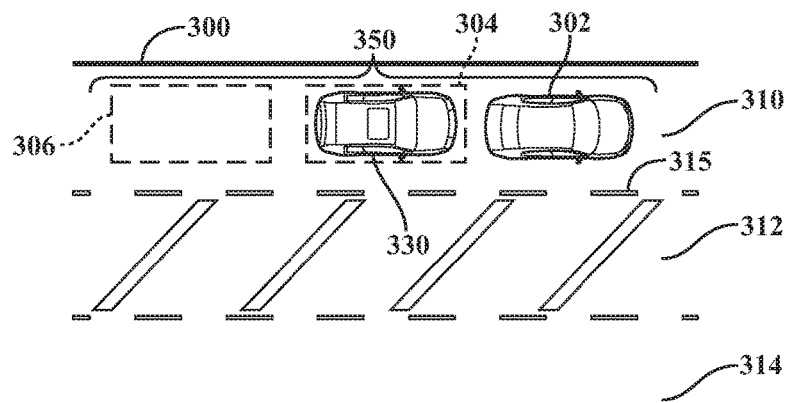

In FIG. 3J, the lead vehicle 302 communicates to the second trailing vehicle 330 that the platoon 350 is complete. The lead vehicle 302 reviews the lead vehicle responsibility and then, through the initiation module 220, communicates to the second trailing vehicle that the platoon 350 is complete. The lead vehicle 302 then sends guidance to the second trailing vehicle regarding exiting the platoon and returning to normal traffic. The guidance provided here can be substantially similar to the guidance described above. The communication can include controlling one or more autonomous systems of the second trailing vehicle 330 and/or providing guidance to the second trailing vehicle regarding speed, distance, and timing for the movement.

Figure 3K:
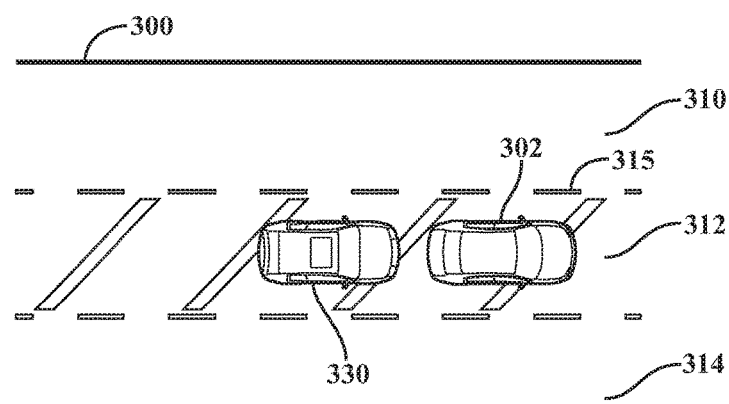

FIG. 3K depicts the platoon 350 dissolved. The lead vehicle 302 and the second trailing vehicle 330 can move into the joining vehicle lane 312. At this point, the lead vehicle 302 can offer guidance to the second trailing vehicle 330, but is no longer providing control instructions from the platoon control module 240. The second trailing vehicle 330 can now take over control of all systems, in preparation for rejoining normal traffic.

Figure 3L:
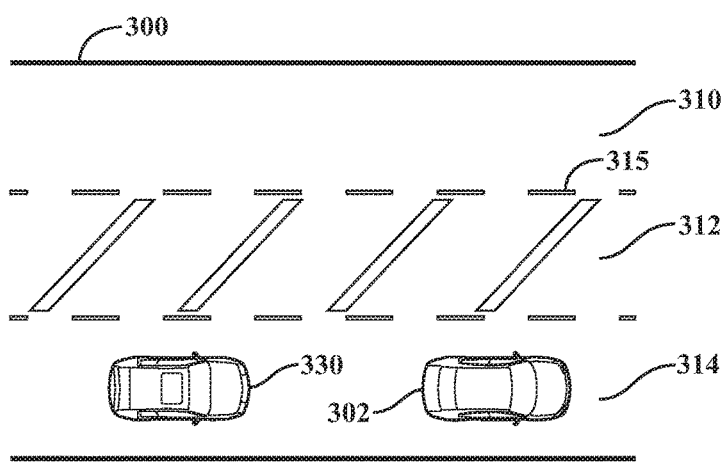

FIG. 3L depicts movement of the lead vehicle 302 and the second trailing vehicle 330 into the independent vehicle lane 314. During this time, the second trailing vehicle 330 can have fulfilled its responsibilities to the platoon 350 by exiting the joining vehicle lane 312 into the independent vehicle lane 314. As well, upon exiting the joining vehicle lane 312, the lead vehicle 302 can have completed the lead vehicle responsibilities. The agreement between can be dissolved at this point, or maintained for future use, depending on the details of the agreement.

Shown here, the platoon coordination system 170 can provide instructions and guidance for a platoon, using a previous agreement of the lead vehicle responsibility and the trailing vehicle responsibility. Once the platoon 350 is no longer needed or desired, the platoon 350 can be dissolved, allowing all vehicles to return to their original driving state (e.g., autonomous or semi-autonomous). Thus, the continued communication and established responsibilities of the first trailing vehicle 320, the second trailing vehicle 330 and the lead vehicle 302 can assure a safe platooning experience for all involved.

Figure 4A:
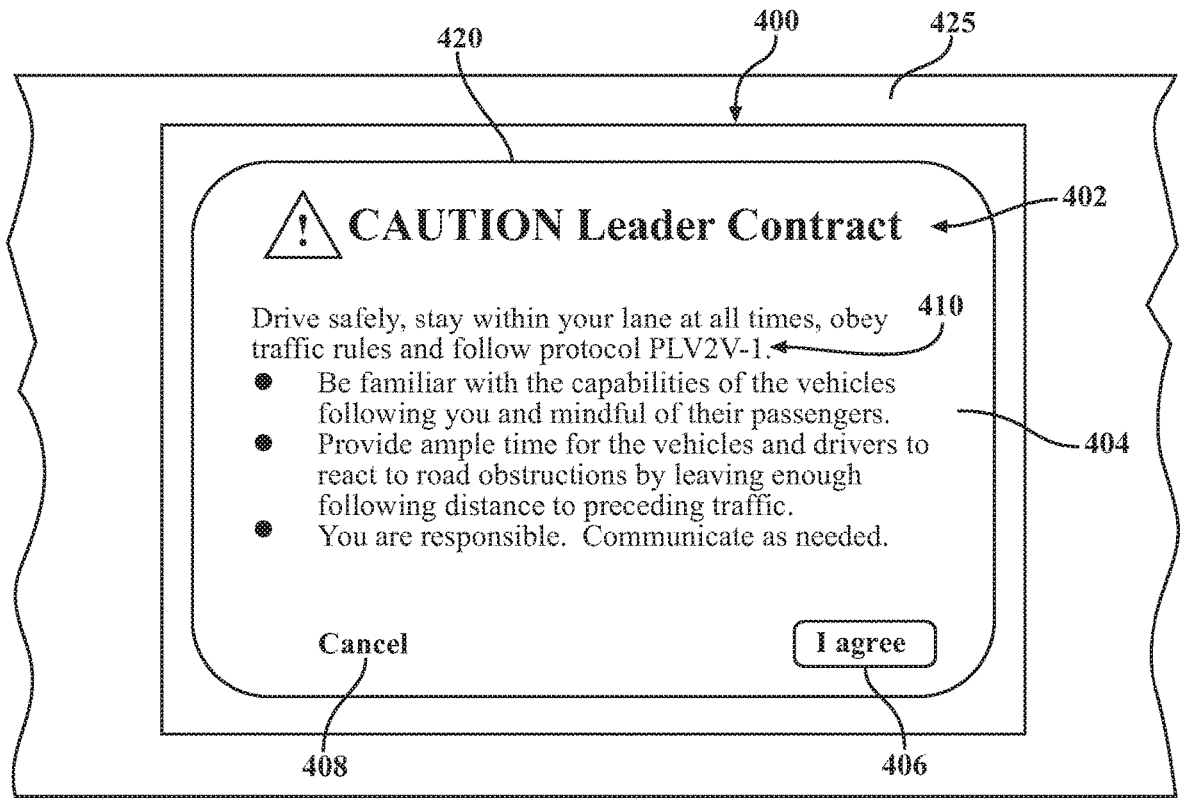
FIGS. 4A and 4B are an illustration of the agreement as part of a platoon coordination system, according to one embodiment.
Figure 4B:
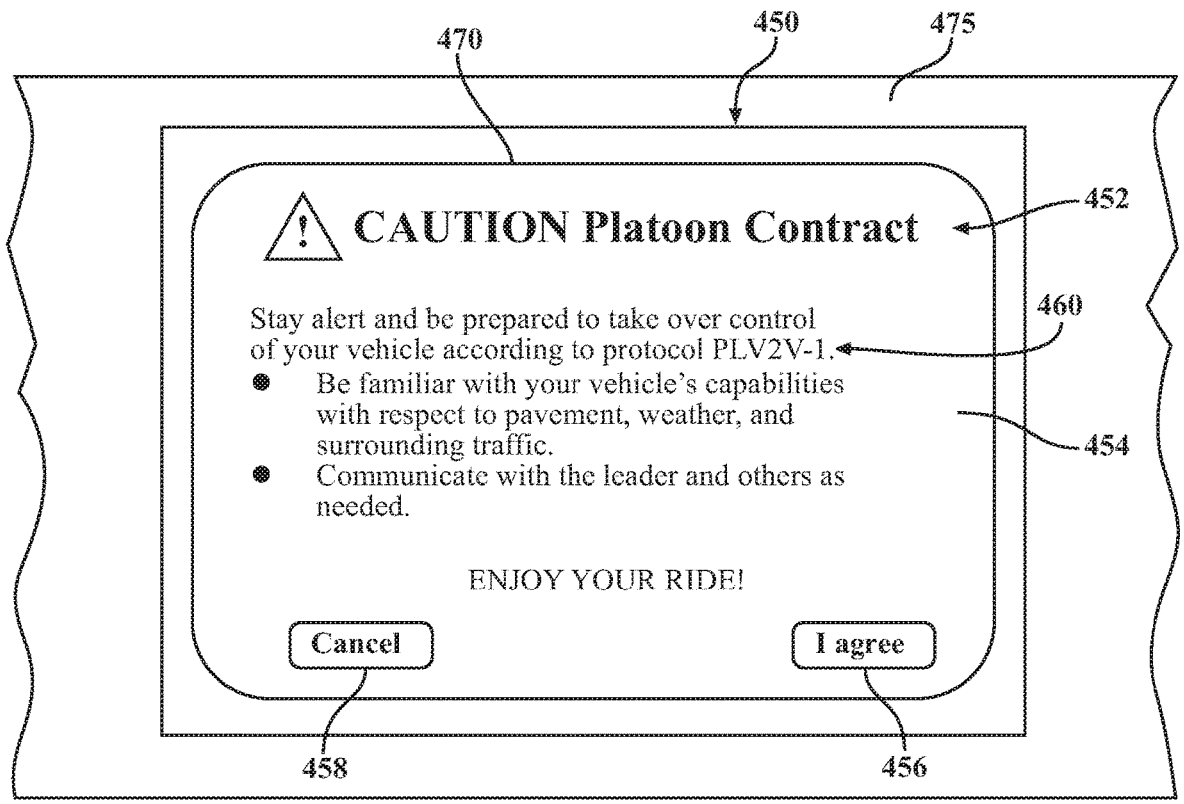

FIGS. 4A and 4B are an illustration of an agreement as used in a platoon coordination system 170, according to embodiments described herein. FIG. 4A depicts the lead vehicle agreement 420 as presented on a display device 400. The display device 400 can be a display configured as a component of a dashboard 425 in a vehicle, such as the vehicle 100. The display device 400 can be a touchscreen, meaning that the display is responsive or otherwise responds to touch, such as from a finger or a stylus. In another embodiment, the display device 400 is a standard screen accepting input by voice commands or buttons.

The display device 400 can receive an agreement as delivered through the platoon coordination system 170 described with reference to FIG. 2. Shown here, the agreement is the lead vehicle agreement 420. The lead vehicle agreement 420 can include the components of the agreement, including a title 402, the terms 404, and a plurality of buttons (shown here as an acceptance button 406 and a decline button 408). The terms 404 can further include a reference for further information, such as reference 410.

The title 402 indicates the party to which the contract applies. Here, the title says "Caution Leader Contract" indicating that the lead vehicle agreement 420 applies to the lead vehicle, described above with reference to FIGS. 3A-3L. The terms 404 can include the lead vehicle responsibility. With consideration of the amount of time for reading while on the road, the contract can, optionally, further include the reference 410. The reference 410 can be a known source of rules or regulations, available to all parties, such that you can familiarize yourself with standard lead vehicle requirements prior to getting on the road. Once the driver of the lead vehicle has reviewed the terms 404, the driver can select either the acceptance button 406 or the decline button 408. The acceptance button 406 and the decline button 408 are depicted as touchscreen buttons, as understood in the art. However, the acceptance button 406 and the decline button 408 can take any form useable for the entry of data, including individual buttons, a component of a keyboard, a selectable portion by a mouse or trackball, or others.

FIG. 4B depicts the trailing vehicle agreement 470 as presented on a display device 450. The display device 450 can be a display configured as a component of a dashboard 475 in a vehicle, such as the vehicle 100. The display device 450 can be substantially similar to the display device 450. The display device 450 can receive an agreement as delivered through the platoon coordination system 170 described with reference to FIG. 2. Shown here, the agreement is the trailing vehicle agreement 470. The trailing vehicle agreement 470 can include the components of the agreement, including a title 452, the terms 454, and a plurality of buttons (shown here as an acceptance button 456 and a decline button 458). The terms 454 can further include a reference for further information, such as reference 460.

The title 452 indicates the party to which the contract applies. Here, the title says "Caution Platoon Contract" indicating that the trailing vehicle agreement 470 applies to the trailing vehicle, described above with reference to FIGS. 3A-3L. The terms 454 can include the trailing vehicle responsibility. With consideration of the amount of time for reading while on the road, the contract can, optionally, further include the reference 460. The reference 460 can be a known source of rules or regulations, available to all parties, such that you can familiarize yourself with standard trailing vehicle requirements prior to getting on the road. Once the driver of the trailing vehicle has reviewed the terms 454, the driver can select either the acceptance button 456 or the decline button 458. The acceptance button 456 and the decline button 458 are depicted as touchscreen buttons, as understood in the art. The acceptance button 456 and the decline button 458 can be substantially similar to the acceptance button 406 and the decline button 408.

Figure 5:
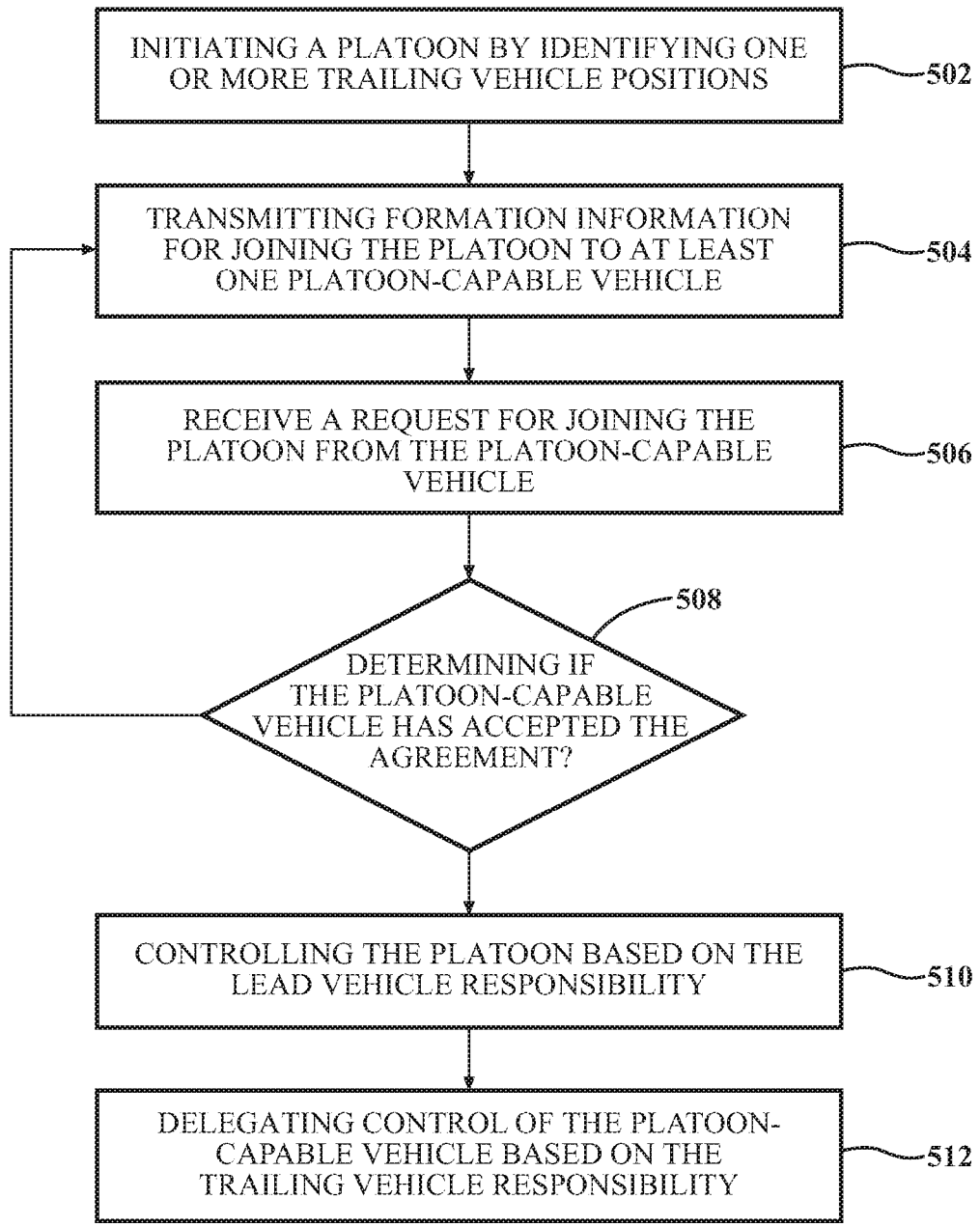
FIG. 5 is a flow diagram of a method for forming a platoon, according to embodiments described herein.

FIG. 5 is a flow diagram of a method 500 for forming a platoon, according to embodiments described herein. The method 500 initiates a platoon and provides an agreement. The agreement can include the lead vehicle responsibility and the trailing vehicle responsibility. The lead vehicle can control at least a portion of the platoon in light of the rules and requirements in the lead vehicle responsibility. In turn, the platoon-capable vehicle can control itself in light of the trailing vehicle responsibility. The method 500 can begin with initiating a platoon by identifying one or more trailing vehicle positions, at 502. Then, formation information can be transmitted for joining the platoon to the platoon-capable vehicle, the formation information including the lead vehicle responsibility to the platoon and the trailing vehicle responsibility for the platoon-capable vehicle, at 504. Then, the lead vehicle can receive a request for joining the platoon from the platoon-capable vehicle, at 506. Once received, the lead vehicle determines if the platoon-capable vehicle has accepted the agreement, at 508. The platoon can then be controlled based on the lead vehicle responsibility, at 510. Control of the platoon-capable vehicle can then be delegated, based on the trailing vehicle responsibility, at 512.

The method 500 can begin with initiating a platoon, at 502. The initiation can establish a lead vehicle and one or more trailing vehicle positions in the platoon. The initiation can further include a transmission to the platoon-capable vehicle that a platoon is being formed. The lead vehicle is the vehicle which guides the platoon and controls the formation and dissolution of the platoon. The lead vehicle can be an autonomous vehicle, a semi-autonomous vehicle or a non-autonomous vehicle, as described above. The initiation can further include the formation of one or more trailing vehicle positions. The one or more trailing vehicle positions are positions in space which are selected by the lead vehicle. These positions can reflect the maximum number of trailing vehicles that the platoon can support or a desired number of vehicles. The initiation can be performed by a system, such as the initiation module 220 of the platoon coordination system 170, described above with reference to FIG. 2.

Then, formation information can be transmitted for joining the platoon to the platoon-capable vehicle, at 504. The formation information can be information stored in a database, such as database 250, described with reference to FIG. 2. The formation information can be stored, managed and transmitted by a system. One system which can be modified to perform the method described here is the platoon coordination system 170, described above with reference to FIG. 2. In one embodiment, the initiation module 220 is modified to store, manage and transmit the formation information. The formation information can include information related to formation of the platoon, control information related to the trailing vehicles and the lead vehicle as related to the platoon, guidance for trailing vehicles for entering and exiting the platoon, and other information. In one embodiment, the formation information can include guidance for entering the platoon and an agreement. The agreement can include the rules and requirements for the members of the platoon (e.g., the lead vehicle, the trailing vehicle and the manufacturer). The agreement can be drafted to reflect the targeted member or the agreement can be generic to all members. The agreement can include the lead vehicle responsibility for the lead vehicle. The agreement can further include the trailing vehicle responsibility for the platoon-capable vehicle. The agreement can further include manufacturer responsibility for the platoon-capable vehicle manufacturer or the lead vehicle manufacturer.

Then, the lead vehicle can receive a request for joining the platoon from the platoon-capable vehicle, at 506. The platoon-capable vehicle can send a request, in response to receiving the formation information and the agreement. The agreement can be accepted prior to receiving the formation information, such as accepting the agreement through a computing device prior to entering the platoon-capable vehicle. In another embodiment, the agreement is accepted while driving the platoon-capable vehicle. One system which can be modified to perform the method described here is the platoon coordination system 170, described above with reference to FIG. 2. In one embodiment, the agreement coordination module 230 is modified to receive the request for joining by all parties (the lead vehicle, the platoon-capable vehicle, and the manufacturer).

Once received, the lead vehicle determines if the platoon-capable vehicle has accepted the agreement, at 508. The request can include confirmation of receipt of the formation information and acceptance of the agreement from the platoon-capable vehicle. The acceptance can be as described above, with relation to FIG. 2. In another embodiment, the acceptance can serve as the request. Upon receiving the request to join, the lead vehicle can review the acceptance of all parties to determine if the platoon-capable vehicle can join the platoon. The request for joining and further processing can be performed by a system. One system which can be modified to perform the method described here is the platoon coordination system 170, described above with reference to FIG. 2. In one embodiment, the agreement coordination module 230 is modified to further confirm the responsibilities of all agreements are agreed to by all parties (lead vehicle, platoon-capable vehicle, and manufacturer), and are capable of being met by all parties. If the platoon-capable vehicle has not accepted the agreement, the formation information for joining the platoon can be re-transmitted to the platoon-capable vehicle, as described at 504.

The platoon can then be controlled based on the lead vehicle responsibility and the trailing vehicle responsibility, at 510. The lead vehicle responsibility can include duties and requirements of the lead vehicle in a platoon, such as hazard avoidance, reporting movements, timing, allowing entrance and exiting and other duties. The lead vehicle can provide information and guidance to the platoon-capable vehicle based on the lead vehicle responsibility. Instructions can be delivered to an autonomous system of the platoon-capable vehicle, such that the lead vehicle controls said autonomous system. Guidance can be direction to a driver such that both parties maintain compliance with their respective responsibilities. Optionally, there can be manufacturer responsibility. The manufacturer responsibility can include duties and requirements of the autonomous system of the platoon-capable vehicle. The manufacturer responsibility can include controlling the autonomous systems within certain parameters (distance, speed, proximity, lane, etc.) while the vehicle is part of the platoon. The request for joining and further processing can be performed by a system. One system which can be modified to perform the method described here is the platoon coordination system 170, described above with reference to FIG. 2. In one embodiment, the platoon control module 240 is modified to control the lead vehicle and, optionally, the platoon-capable vehicle as part of the platoon, provide guidance to the platoon-capable vehicle regarding entering, exiting and operating within the platoon, and other responsibilities as delegated to the lead vehicle in the lead vehicle responsibility. The control, including instructions and guidance, can be exclusive of the trailing vehicle responsibility.

Control of the platoon-capable vehicle can then be delegated, based on the trailing vehicle responsibility, at 512. The trailing vehicle responsibility can include duties of the platoon-capable vehicle to the platoon and/or to the lead vehicle, which can include maintaining lane, maintaining speed, requesting exit and entry with adequate time, and others. The trailing vehicle responsibility can be delegated to the platoon-capable vehicle. In one embodiment, the lead vehicle can then control at least a portion of the platoon to relinquish control of functions related to the trailing vehicle responsibility. One system which can be modified to perform the method described here is the platoon coordination system 170, described above with reference to FIG. 2. In one embodiment, the platoon control module 240 is modified to delegate control of the platoon-capable vehicle as part of the platoon, to the platoon-capable vehicle in light of the trailing vehicle responsibility.

Other and further embodiments of the systems and methods described above are contemplated, including combinations of or deletions from said systems and methods, without specific recitation thereof. In a further embodiment, the platoon-capable vehicle can move into one of the one or more trailing vehicle positions using the formation information. In a further embodiment, the lead vehicle responsibility to the platoon and the trailing vehicle responsibility are mutually exclusive. In a further embodiment, the formation information can further include guidance for entering and exiting the platoon. In a further embodiment, the trailing vehicle responsibility can include one or more inter-platoon responsibilities, inter-platoon responsibilities being responsibilities established between the platoon-capable vehicles while interacting with the platoon. In a further embodiment, the platoon control module can further include instructions to control one or more autonomous systems of the platoon-capable vehicle, wherein the control does not include the trailing vehicle responsibility. In a further embodiment, the acceptance of the agreement occurs through a computing device outside of the platoon-capable vehicle.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible embodiments of systems, methods and computer program products according to various embodiments. In this regard, each block in the flowcharts or block diagrams can represent a module, segment, or portion of code, which can include one or more executable instructions for implementing the specified logical function(s). It should also be noted that, in some alternative embodiments, the functions noted in the block can occur out of the order noted in the Figures. For example, two blocks shown in succession can, in fact, be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods described herein. These elements also can be embedded in an application product which can include all the features enabling the embodiment of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

While the foregoing is directed to embodiments of the disclosed devices, systems, and methods, other and further embodiments of the disclosed devices, systems, and methods can be devised without departing from the basic scope thereof. The scope thereof is determined by the claims that follow.

What is claimed is:

1. A platoon coordination system for organizing multiple vehicle control, comprising:
   one or more processors; and
   a memory communicably coupled to the one or more processors and storing instructions that when executed by the one or more processors cause the one or more processors to:
      initiate a platoon by identifying one or more trailing vehicle positions;
      transmit formation information for joining the platoon to at least one platoon-capable vehicle, the formation information comprising at least one lead vehicle responsibility to the platoon and at least one trailing vehicle responsibility delegated to the at least one platoon-capable vehicle;
      receive a request for joining the platoon from the at least one platoon-capable vehicle, the request including acceptance of an agreement from the at least one platoon-capable vehicle, the agreement comprising the at least one lead vehicle responsibility and the at least one trailing vehicle responsibility;
      control at least a portion of the platoon based on the at least one lead vehicle responsibility; and
      delegate control of the platoon-capable vehicle based on the at least one trailing vehicle responsibility.

2. The platoon coordination system of claim 1, wherein the at least one platoon-capable vehicle moves into one of the one or more trailing vehicle positions using the formation information.

3. The platoon coordination system of claim 1, wherein the at least one lead vehicle responsibility to the platoon and the at least one trailing vehicle responsibility are mutually exclusive.

4. The platoon coordination system of claim 1, wherein the formation information further comprises guidance for entering and exiting the platoon.

5. The platoon coordination system of claim 1, wherein the at least one trailing vehicle responsibility includes one or more inter-platoon responsibilities that are established between two or more platoon-capable vehicles while interacting with the platoon.

6. The platoon coordination system of claim 1, wherein the memory stores further instructions that when executed by the one or more processors cause the one or more processors to:
   control one or more autonomous systems of the at least one platoon-capable vehicle, wherein the control does not include the at least one trailing vehicle responsibility.

7. The platoon coordination system of claim 1, wherein the acceptance of the agreement occurs through a computing device outside of the platoon-capable vehicle.

8. A non-transitory computer-readable medium for organizing multiple vehicle control and storing instructions that when executed by one or more processors cause the one or more processors to:
   initiate a platoon by identifying one or more trailing vehicle positions;
   transmit formation information for joining the platoon to at least one platoon-capable vehicle, the formation information comprising at least one lead vehicle responsibility to the platoon and at least one trailing vehicle responsibility delegated to the at least one platoon-capable vehicle;
   receive a request for joining the platoon from the at least one platoon-capable vehicle, the request including acceptance of an agreement from the at least one platoon-capable vehicle, the agreement comprising the at least one lead vehicle responsibility and the at least one trailing vehicle responsibility;
   control at least a portion of the platoon based on the at least one lead vehicle responsibility; and
   delegate control of the platoon-capable vehicle based on the at least one trailing vehicle responsibility.

9. The non-transitory computer-readable medium of claim 8, wherein the at least one platoon-capable vehicle moves into one of the one or more trailing vehicle positions using the formation information.

10. The non-transitory computer-readable medium of claim 8, wherein the at least one lead vehicle responsibility to the platoon and the at least one trailing vehicle responsibility are not overlapping.

11. The non-transitory computer-readable medium of claim 8, wherein the formation information further comprises guidance for entering and exiting the platoon.

12. The non-transitory computer-readable medium of claim 8, wherein the at least one trailing vehicle responsibility includes one or more inter-platoon responsibilities, inter-platoon responsibilities being responsibilities established between two or more platoon-capable vehicles while interacting with the platoon.

13. The non-transitory computer-readable medium of claim 8, further comprising instructions to control one or more autonomous systems of the at least one platoon-capable vehicle, wherein the control does not include the at least one trailing vehicle responsibility.

14. The non-transitory computer-readable medium of claim 8, wherein the acceptance of the agreement occurs through a computing device outside of the platoon-capable vehicle.

15. A method for organizing multiple vehicle control, comprising:
   initiating, using one or more processors, a platoon by identifying one or more trailing vehicle positions;
   transmitting, using one or more processors, formation information for joining the platoon to at least one platoon-capable vehicle, the formation information comprising at least one lead vehicle responsibility to the platoon and at least one trailing vehicle responsibility delegated to the at least one platoon-capable vehicle;
   receiving, using one or more processors, a request for joining the platoon from the at least one platoon-capable vehicle, the request including acceptance of an agreement from the at least one platoon-capable vehicle, the agreement comprising the at least one lead vehicle responsibility and the at least one trailing vehicle responsibility;

controlling, using one or more processors, the platoon based on the at least one lead vehicle responsibility; and delegating, using one or more processors, control of the platoon-capable vehicle based on the at least one trailing vehicle responsibility.

16. The method of claim 15, wherein the at least one lead vehicle responsibility to the platoon and the at least one trailing vehicle responsibility are not overlapping.

17. The method of claim 15, wherein the formation information further comprises guidance for entering and exiting the platoon.

18. The method of claim 15, wherein the at least one trailing vehicle responsibility includes one or more inter-platoon responsibilities, the one or more inter-platoon responsibilities being responsibilities established between two or more platoon-capable vehicles while interacting with the platoon.

19. The method of claim 15, further comprising controlling one or more autonomous systems of the at least one platoon-capable vehicle, wherein the control does not include the at least one trailing vehicle responsibility.

20. The method of claim 15, wherein the acceptance of the agreement occurs through a computing device outside of the platoon-capable vehicle.

* * * * *